United States Patent [19]
Chaiko et al.

[11] Patent Number: 5,948,263
[45] Date of Patent: Sep. 7, 1999

[54] METHOD FOR SEPARATING WATER SOLUBLE ORGANICS FROM A PROCESS STREAM BY AQUEOUS BIPHASIC EXTRACTION

[75] Inventors: David J. Chaiko; William A. Mego, both of Naperville, Ill.

[73] Assignee: The United States of America as represented by the United States Department of Energy, Washington, D.C.

[21] Appl. No.: 08/873,297

[22] Filed: Jun. 11, 1997

[51] Int. Cl.[6] .............................. B01D 11/00; B01D 11/04
[52] U.S. Cl. ........................ 210/634; 210/638; 210/774; 210/805
[58] Field of Search .................... 210/634, 638, 210/639, 774, 805, 806, 908, 909, 912, 635; 423/8, 21.5, 24

[56] References Cited

U.S. PATENT DOCUMENTS

| | | | |
|---|---|---|---|
| 3,306,714 | 2/1967 | Goren ............................... | 23/321 |
| 4,561,887 | 12/1985 | Domic et al. ..................... | 75/416 |
| 4,765,834 | 8/1988 | Ananthapadmanabhan ...... | 75/108 |
| 4,902,425 | 2/1990 | Kenney ............................. | 210/634 |
| 4,965,054 | 10/1990 | Lewis ................................ | 423/204 |
| 5,078,886 | 1/1992 | Hsu ................................... | 210/632 |
| 5,271,840 | 12/1993 | Kresheck ........................... | 210/634 |
| 5,308,503 | 5/1994 | Strom ................................ | 210/728 |
| 5,395,532 | 3/1995 | Chaiko .............................. | 209/172 |
| 5,411,149 | 5/1995 | Chaiko et al. ..................... | 209/172.5 |
| 5,512,180 | 4/1996 | Ho .................................... | 210/643 |
| 5,603,834 | 2/1997 | Rogers et al. .................... | 210/638 |
| 5,611,919 | 3/1997 | Strom ................................ | 210/168 |
| 5,611,934 | 3/1997 | Shepperd et al. ................ | 210/719 |
| 5,707,525 | 1/1998 | Rogers et al. .................... | 216/634 |
| 5,720,882 | 2/1998 | Stendahl et al. ................. | 210/639 |
| 5,766,478 | 6/1998 | Smith et al. ...................... | 210/638 |
| 5,772,888 | 6/1998 | Liu et al. .......................... | 210/634 |

*Primary Examiner*—Joseph W. Drodge
*Attorney, Agent, or Firm*—Lisa Soltis; Mark P. Dvorscak; William R. Moser

[57] ABSTRACT

A method for separating water-miscible organic species from a process stream by aqueous biphasic extraction is provided. An aqueous biphase system is generated by contacting a process stream comprised of water, salt, and organic species with an aqueous polymer solution. The organic species transfer from the salt-rich phase to the polymer-rich phase, and the phases are separated. Next, the polymer is recovered from the loaded polymer phase by selectively extracting the polymer into an organic phase at an elevated temperature, while the organic species remain in a substantially salt-free aqueous solution. Alternatively, the polymer is recovered from the loaded polymer by a temperature induced phase separation (cloud point extraction), whereby the polymer and the organic species separate into two distinct solutions. The method for separating water-miscible organic species is applicable to the treatment of industrial wastewater streams, including the extraction and recovery of complexed metal ions from salt solutions, organic contaminants from mineral processing streams, and colorants from spent dye baths.

27 Claims, 7 Drawing Sheets

EXTRACTION OF Pu(IV) BY ARSENAZO III (O's) AND CHLOROPHOSPHONAZO III (Δ's) AS A FUNCTION OF PEG-PHASE pH IN THE PEG-3400/$(NH_4)_2SO_4$ SYSTEM AT 25° C. EXTRACTANT CONCENTRATIONS WERE 0.0075 wt %

EXTRACTION OF Pu(IV) AS A FUNCTION OF CHLOROPHOSPHONAZO III CONCENTRATION IN THE PEG-3400/$(NH_4)_2SO_4$ SYSTEM AT 25° C.

METHOD FOR SEPARATING WATER SOLUBLE ORGANICS FROM A PROCESS STREAM BY AQUEOUS BIPHASIC EXTRACTION

CONTRACTUAL ORIGIN OF THE INVENTION

The United States Government has rights in this invention pursuant to Contract Number W-31-109-ENG-38 between the United States Government and Argonne National Laboratory.

BACKGROUND OF INVENTION

1. Field of the Invention

The present invention relates to a method for separating water-miscible organic species from a process stream by aqueous biphasic extraction. In particular, the method includes extracting the organic species into a polymer-rich phase of an aqueous biphase system in which the process stream comprises the salt-rich phase, and, next, separating the polymer from the extracted organic species by contacting the loaded, polymer-rich phase with a water-immiscible organic phase. Alternatively, the polymer can be separated from the extracted organic species by raising the temperature of the loaded, polymer-rich phase above the cloud point, such that the polymer and the water-soluble organic species separate into two distinct aqueous phases. In either case, a substantially salt-free, concentrated aqueous solution containing the organic species is recovered.

2. Description of Prior Art

Aqueous biphasic extraction involves the selective partitioning of species between two immiscible aqueous phases. These aqueous/aqueous systems form spontaneously from mixtures of aqueous solutions of unlike polymers, typically a straight-chain polymer such as polyethylene glycol (PEG) and a highly branched polymer such as dextran. Aqueous biphase systems may also be generated from mixtures of organic polymers and inorganic salt solutions. In either case, water is the major component of both phases. For large-scale applications, the polymer/salt biphase systems are generally more commercially attractive than polymer/polymer systems because of their lower cost and higher liquid/liquid phase separation rates.

Solutes present in the biphase system will selectively partition into one of the phases according to the relative solubility of the solute in the two phases. The partition behavior of a solute is described by the partition coefficient, which is the ratio of the solute concentration in the less-dense phase to the solute concentration in the more-dense phase. Phase transfer agents may be added to enhance the selective partitioning of solutes between the two phases. In this regard, aqueous biphase systems are analogous to conventional oil/water solvent extraction systems. However, unlike conventional solvent extraction systems, the two immiscible phases in an aqueous biphase system share a common diluent—water. Therefore, the potential for process upset due to excessive mass transfer of water must be carefully considered. To prevent the net mass transfer of water between the liquid phases, the polymer-rich and salt-rich phases can be contacted at compositions defined by the tie lines from the appropriate polymer/salt/water phase diagram.

Development of an efficient extraction system depends on the ability to manipulate the partitioning behavior of solutes, which can be accomplished by changing the properties of the solvents or the solute. Variables that influence the properties of the solvent include the type, molecular weight, and concentration of the phase-forming polymer, the type and concentration of phase transfer agents, the pH, and the temperature. Variables that influence the properties of solutes are the pH of the system, the type and concentration of phase transfer agents, and structural modifications, including chemical treatment of the solute.

Currently, aqueous biphase systems are in wide use as a highly efficient separation and purification technique for biological materials, including proteins, nucleic acids, peptides, cells, subcellular organelles, and viruses. For example, U.S. Pat. No. 5,308,503 to Strom teaches a method for separating microbial contaminants, including bacteria and fungi, from industrial lubricating oils and cutting liquids using an aqueous polymeric biphase system. The less-dense phase of the biphase system contains a low-molecular-weight polymer and the cutting liquid, and the more-dense phase contains a high-molecular-weight polymer or an inorganic salt, each phase having a high water content. The phases are mixed together and transferred to a separator, wherein the cutting liquid concentrates in the less-dense polymer phase and the microbial contaminants collect in the more-dense phase.

Recently, aqueous biphase systems have been recognized as a highly adaptable separation technique for the selective separation and recovery of particulates from solid and liquid waste streams, including the processing of mineral ores and the treatment of solid radioactive wastes, liquid nuclear wastes, and contaminated soils. A need in the art continues to exist for low cost, highly efficient, large-scale separation procedures for the extraction of inorganic and organic solutes from various industrial process streams.

A long-standing problem associated with aqueous biphase systems is the inability to efficiently recover, or back extract, the separated and concentrated solute from the polymer-rich phase. This is primarily due to the relatively high salt concentrations required to maintain the aqueous biphase system.

Solid support-based biphase separation systems, or solid/liquid systems, have been developed to overcome the back extraction problem associated with the aqueous biphase liquid/liquid system. For example, U.S. Pat. No. 5,603,834 to Rogers, et al., discloses a method for recovering pertechnetate ions from an aqueous solution by using resins impregnated with a water-soluble polymer. Additional approaches include treating the loaded polymer phase with ion exchange resins or back extracting the solutes into secondary, salt-rich aqueous phases. These processes, however, are inefficient and generate significant amounts of waste.

The present invention is a method for separating water-soluble organic species from a process stream by aqueous biphasic extraction that overcomes the back extraction difficulties experienced in the prior art. During the extraction step, a process stream comprised water, salt, and the organic species of interest is contacted with an aqueous polymer solution to generate an aqueous biphasic extraction system. The organic species partition to and concentrate in the polymer-rich phase, and the phases are separated. Next, in a polymer recovery step, the polymer-rich phase containing the extracted organic species is contacted with an organic solvent. The polymer concentrates in the organic phase, and this phase is separated from the water-soluble organic species, which are recovered in a substantially salt-free solution. The remaining organic phase containing the polymer is subjected to further method steps, resulting in recyclable, secondary streams of the phase-forming components.

In an alternative embodiment, the polymer recovery step is performed by raising the temperature of the loaded, polymer-rich phase above the cloud point, thereby causing the polymer and the organic solutes to separate into two distinct phases.

An advantage of the aqueous biphase partitioning system is that the components, which include inorganic salts, and water soluble polymers, and about 60 to 90 wt % water, are all inexpensive, nontoxic, and non-flammable. In addition, the phase-forming components of the system can be recovered for recycling, resulting in a continuous process operable on an industrial scale.

Therefore, in view of the above, a basic object of the present invention is to provide a low cost, highly efficient, and continuous method that can be readily scaled-up for separating water-miscible organics from industrial process streams.

Another object of this invention is to provide a method for recovering organic species from a process stream using aqueous biphasic extraction, including the separation of the organic species from a polymer-rich phase.

Another object of this invention is to provide a method for separating organic species from a processes stream using aqueous biphasic extraction, including the recovery and recycle of phase-forming components.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of instrumentation and combinations particularly pointed out in the appended claims.

BRIEF SUMMARY OF THE INVENTION

The present invention relates to a method for separating and recovering water-miscible organic species from a process stream by aqueous biphase extraction.

Briefly, in an extraction step, a process stream comprised of water, salt, and water-miscible organic species is contacted with an aqueous, non-ionic polymer solution to generate an aqueous biphasic extraction system. The biphase system has two distinct, immiscible liquid layers: an aqueous, salt-rich phase containing the organic species and an aqueous, polymer-rich phase. The organic species migrate from the salt-rich phase to the polymer-rich phase, concentrating in the polymer-rich phase. The polymer phase containing the extracted organics is separated from the remaining salt phase, which is substantially free of organic species.

Next, in a polymer recovery step, the polymer-rich phase containing the water-miscible, organic species is contacted with a water-immiscible organic phase. An oil/water system is formed, comprised of the polymer phase containing the extracted organic species and an organic phase. The polymer partitions selectively into the organic phase, and a substantially salt-free solution of the water-miscible organic species remains. In the preferred embodiment, the transfer of the polymer into the organic phase is conducted at an elevated temperature. The polymer can further be recovered from the organic phase by transferring the polymer into an aqueous phase.

In an alternative embodiment, the polymer recovery step includes raising the temperature of the loaded, polymer-rich phase above the cloud point, thereby causing the polymer and the organic species to concentrate in two distinct phases.

Importantly, the resulting secondary streams, which include an aqueous salt solution, an aqueous polymer solution, and an organic phase, are all phase-forming components that can be appropriately recycled into the system.

Three non-limiting examples of the invented method are provided, wherein complexed metal ions are separated from a salt solution, organic contaminants are separated from a mineral processing stream, and colorants are separated from a spent dye bath solution.

BRIEF DESCRIPTION OF THE DRAWINGS

The appended claims set forth those novel features which characterize the invention. However, the invention itself, as well as further objects and advantages thereof, will best be understood by reference to the following detailed description of a preferred embodiment taken in conjunction with the accompanying drawings, where like reference characters identify like elements throughout the various figures, in which:

DETAILED DESCRIPTION OF THE INVENTION

The present invention is a method for separating water-miscible organic species from a process stream by aqueous biphasic extraction. The first step of the method includes extracting the water-miscible organic species from the process stream by selectively partitioning the water-miscible organic species into a polymer phase using an aqueous biphase system. The aqueous biphase system is comprised of an aqueous salt solution and an aqueous polymer solution. The second step of the method includes recovering the polymer from the polymer phase containing the organic species by selectively partitioning the polymer into an organic phase. An alternative polymer recovery step includes raising the temperature of the polymer phase containing the extracted organic species above the cloud point of the polymer, such that the polymer and the extracted organic species separate into two distinct phases.

Figure 1:
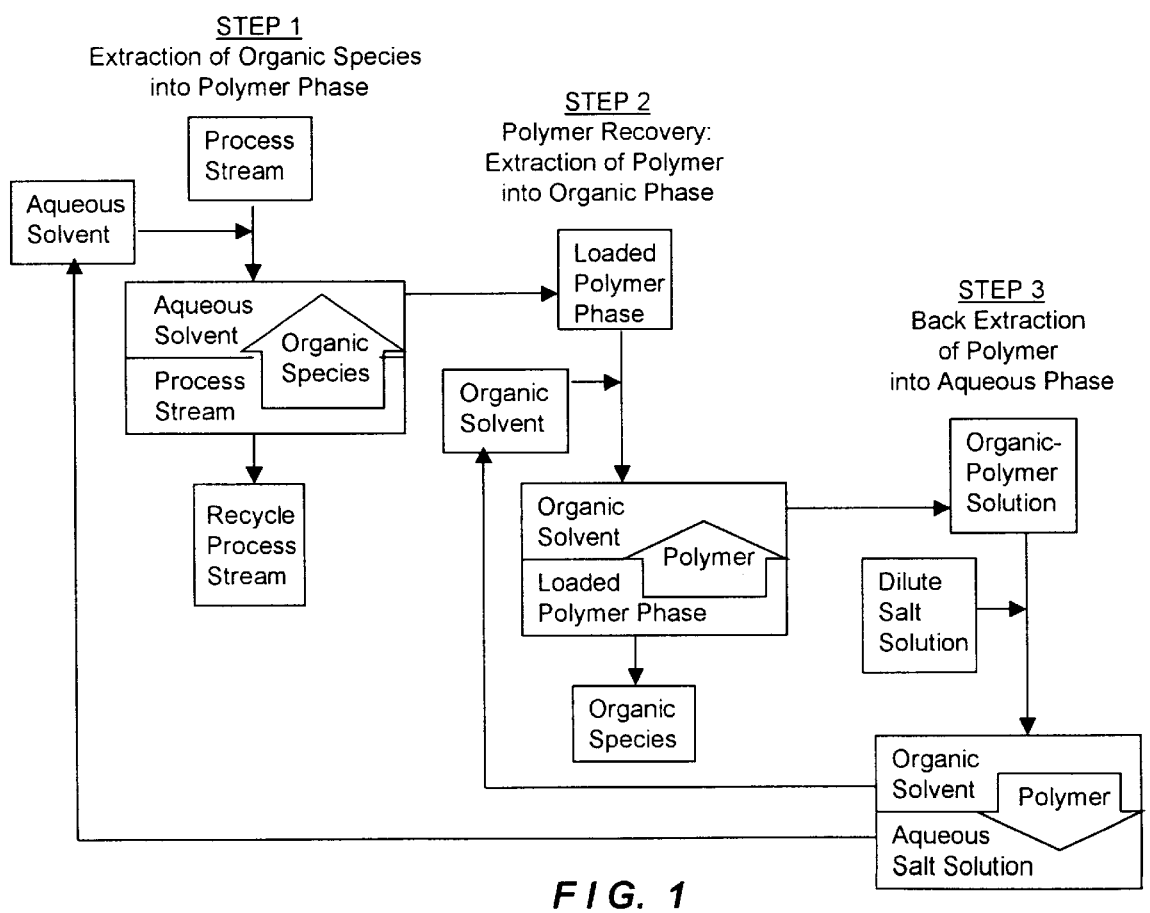
FIG. 1 is a schematic flow diagram of the invented method, including an extraction step, a polymer recovery step, and a polymer back extraction step.

FIG. 1 schematically illustrates the method for separating water-miscible organic species from a process stream using aqueous biphasic extraction. The two distinct liquid layers which are formed by contacting or mixing specific solutions together are referred to herein as "phases" and are further characterized by the components of the solution, i.e. polymer-rich phase, salt-rich phase, organic phase.

In a first, solvent extraction step, an aqueous biphase system is generated by contacting, or mixing, the process stream (an aqueous inorganic salt solution containing the water-miscible organic species) with an aqueous polymer solution (aqueous solvent). The process stream and the aqueous polymer solution each contain about 60 to 90 wt % water and are immiscible. The preferred phase-forming polymer is polyethylene glycol (PEG). Additional polymers include, but are not limited to, polypropylene glycol (PPG), polyvinyl alcohol (PVA), methoxypolyethylene glycol (mPEG), branched PEG (bPEG), polyvinyl pyrrolidone (PVP), and copolymers of PEG and PPG. Preferably, the water-soluble polymers have molecular weights ranging from about 1,500 to about 20,000. For PPG, the molecular weight should be in the range of about 400 to about 700.

Inorganic salts that promote biphase formation with polymer solutions include, but are not limited to, sodium or potassium salts of sulfate, phosphate, carbonate, and hydroxide. The following anions may also be present without adversely affecting the ability to generate an aqueous biphase system: $CrO_4^{2-}$, $WO_4^{2-}$, $SO_3^{2-}$, $MoO_4^{2-}$, and $SeO_4^{2-}$. For maximum efficiency, the aqueous biphase system is generated at temperatures above about 25° C. but below about 80° C. The aqueous inorganic salt solution containing the water-miscible organic species forms the salt-rich, more-dense phase of the aqueous biphase system, and the aqueous polymer solution forms the less-dense, polymer-rich phase. At sufficiently high temperatures, the system undergoes a density inversion, and the polymer-rich phase becomes the more-dense phase, while the salt-rich phase becomes the less-dense phase.

Other inorganic salts also promote aqueous biphase formation with polymer solutions at higher temperatures. For example, alkali metal salts of nitrate, nitrite, and chloride form aqueous biphase systems with a polymer solution at temperatures in the range of about 95° C. to about 120° C. In these aqueous biphase systems, the aqueous salt solution forms the less-dense phase and the aqueous polymer solution forms the more-dense phase. The effects of individual salts in a mixture are additive, and the temperature required to generate a biphase system can be estimated from linear correlations of cloud point lowering by the individual salts.

Following the generation of the aqueous biphase system, the organic solutes contained in the salt-rich phase are selectively partitioned into the polymer-rich phase. The selective partitioning results in significant concentration of the organic species, the extent of which depends on the partition coefficient and the liquid/liquid volume ratio. The aqueous polymer solution containing the organic species, also called the loaded polymer phase, is separated from the remaining salt-rich phase for further processing. Importantly, the remaining salt-rich phase is substantially free of organic species and available for recycling into the aqueous biphase system or another process, at a significant cost savings.

In a second, polymer recovery step, the polymer is extracted from the loaded polymer phase into an organic phase, while the organic species remains in the aqueous phase, resulting in the successful isolation of the organic species from the process stream. The polymer-rich phase containing the organic solute, or loaded polymer phase, is contacted or mixed with a water-immiscible organic solvent, resulting in the generation of an oil/water system comprised of an organic phase (less dense) and an aqueous, polymer-rich phase containing the organic solute and a low concentration of salt (more dense). Preferably, the organic solvent is an alcohol, such as butanol or pentanol. The non-ionic polymer partitions to the organic phase, resulting in a high concentration of the polymer in the organic phase. The extracted organic species, which are not soluble in the organic solvent, remain in an aqueous solution. The phases are separated, and a substantially salt-free aqueous solution containing a high concentration of the extracted organic species and an organic solution containing a high concentration of the polymer are recovered.

Importantly, in the polymer recovery step, the mass transfer of polymer to the organic phase results in a high volume transfer between the two phases, and, thus, the volume of the remaining aqueous solution containing the extracted organic species (product) is significantly reduced.

The affinity of the polymer for the organic phase is temperature dependent, and, therefore, the polymer recovery step is conducted at elevated temperatures, preferably greater than 50° C., and more preferably between about 60° C. and about 80° C., to enhance the efficiency of the system. The elevated temperature provides the thermodynamic driving force for the selective partitioning of the polymer from the aqueous phase into the organic phase. In general, increasing the temperature and the molecular weight of the polymer leads to more favorable partitioning of the polymer into the organic phase.

To demonstrate the partition behavior of a polymer in an oil/water system, a polymer-rich phase was first prepared by equilibrating equal volumes of 15 wt % PEG and 12 wt % $Na_2SO_4$ solution at 60° C. The PEG-rich phase was separated from the salt-rich phase and contacted with n-butanol at 60° C. An initial oil/water volume ratio of 1 produced an equilibrium volume ratio of 5.

Table I lists the partition coefficient data for two different PEG molecular weights in the two-phase system comprised of n-butanol, water, sodium sulfate, and PEG.

TABLE 1

| PARTITIONING IN THE n-BUTANOL/WATER/SULFATE/PEG SYSTEM AT 60° C | |
|---|---|
| Species | Partition Coefficient |
| PEG-4,000 | ~15 |
| PEG-10,000 | ~35 |
| Sulfate | 0.001 |
| n-Butanol | 12.7 |

As listed above, the partition coefficient for PEG-4,000 in the oil/water system is approximately 15, while the partition coefficient for the salt (sulfate) is approximately $10^{-3}$. The mass transfer of PEG into the alcohol phase results in a significant phase volume change, so that even though the partition coefficient for PEG is marginal, a PEG recovery of 99.4% was still achieved.

In a third, polymer back extraction step, the polymer is back extracted from the organic phase by contacting the organic-polymer solution with a dilute salt solution at low temperature. Alternatively, the organic-polymer solution is contacted with deionized water at a reduced temperature, preferably less than about 20° C., and more preferably at about 5° C. The dilute aqueous salt solution and the organic-polymer solution form two distinct phases. The polymer partitions to the aqueous salt solution forming an aqueous polymer-salt solution. The phases are separated, and the remaining organic solvent and the recovered polymer-salt solution are available for recycling into the system.

Table II contains data which show the partition behavior of the polymer in the polymer back extraction step. For the generated organic/polymer/salt/water solution, initial organic to aqueous phase volume ratios of 1 produced phase volume ratios of 0.3, at equilibrium.

TABLE II

SEPARATION OF PEG-4,000 FROM n-BUTANOL

| Na2SO4 | PEG-4,000 Partition Coefficient | | n-Butanol Partition Coefficient | |
|---|---|---|---|---|
| wt % | 20° C. | 5° C. | 20° C. | 5° C. |
| 0 | 0.048 | 0.025 | 10.1 | 10.4 |
| 0.01 | 0.044 | 0.028 | 10.4 | — |
| 0.05 | 0.047 | 0.028 | — | — |
| 5.0 | — | — | — | 13.5 |

Table II demonstrates that temperature is the primary factor in determining the partition behavior of the polymer. Thus, the invented method incorporates the temperature-driven partitioning behavior of high-molecular-weight polymers in organic/water systems. As in the polymer extraction step, wherein the polymer is extracted from the loaded polymer phase into the organic phase, the back extraction of the polymer from the organic phase into the dilute salt solution causes a large phase volume change.

Figure 2:
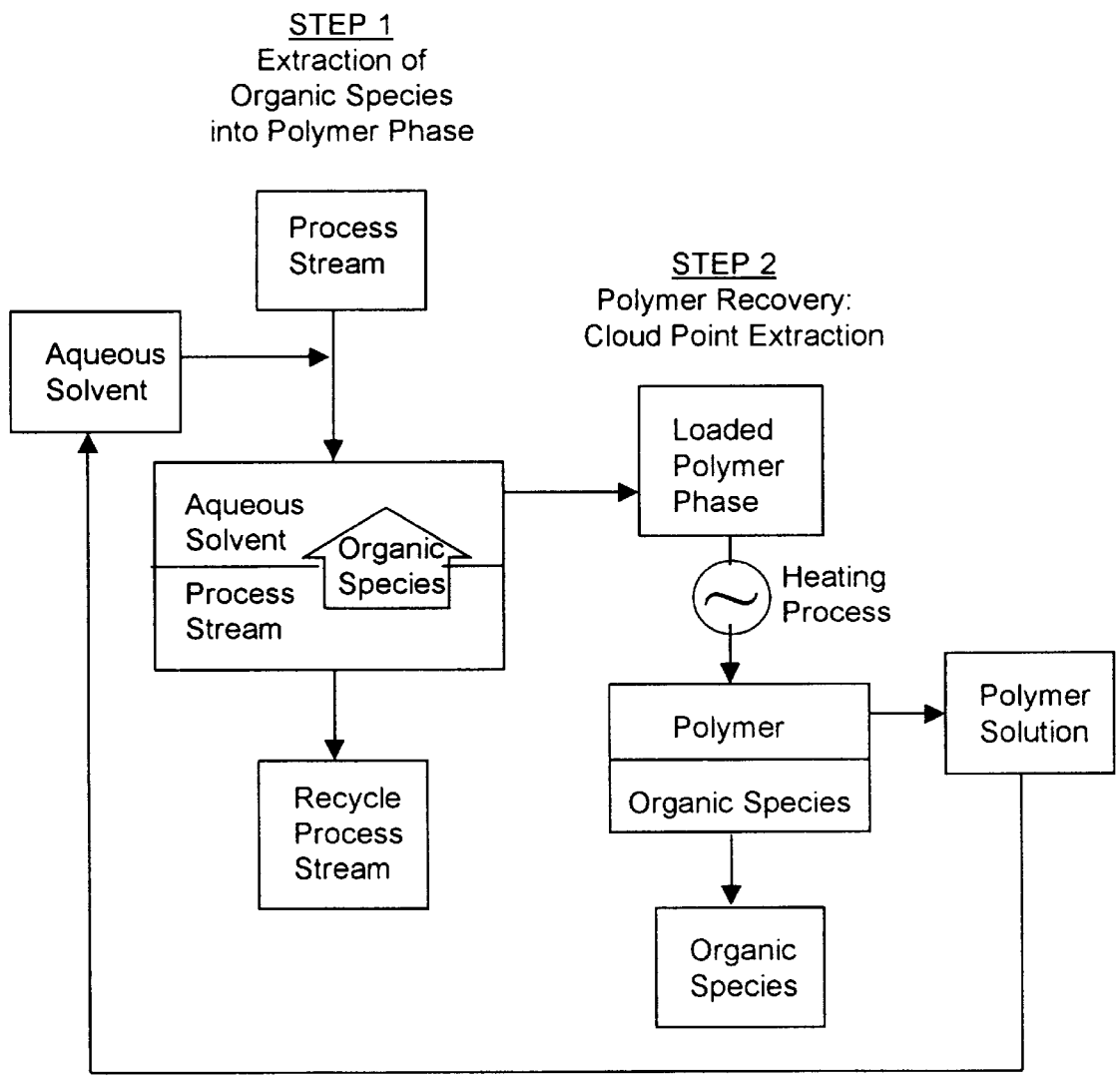
FIG. 2 is a schematic flow diagram of the invented method, including an alternate polymer recovery step.

FIG. 2 schematically illustrates an alternate polymer recovery step (Step 2) which includes separating the polymer from the extracted organic species by subjecting the loaded polymer-rich phase to a cloud point extraction. The temperature of the loaded polymer phase is raised above the cloud point, a temperature that results in the polymer and the ionized organic solutes separating into an aqueous biphase system comprised of a highly concentrated polymer solution and an aqueous solution containing the extracted organic species with a low concentration of salt. The phases are separated and recovered. The polymer solution can be recycled into the biphase system.

EXAMPLE 1—COMPLEXED METAL ION EXTRACTION

Figure 3:
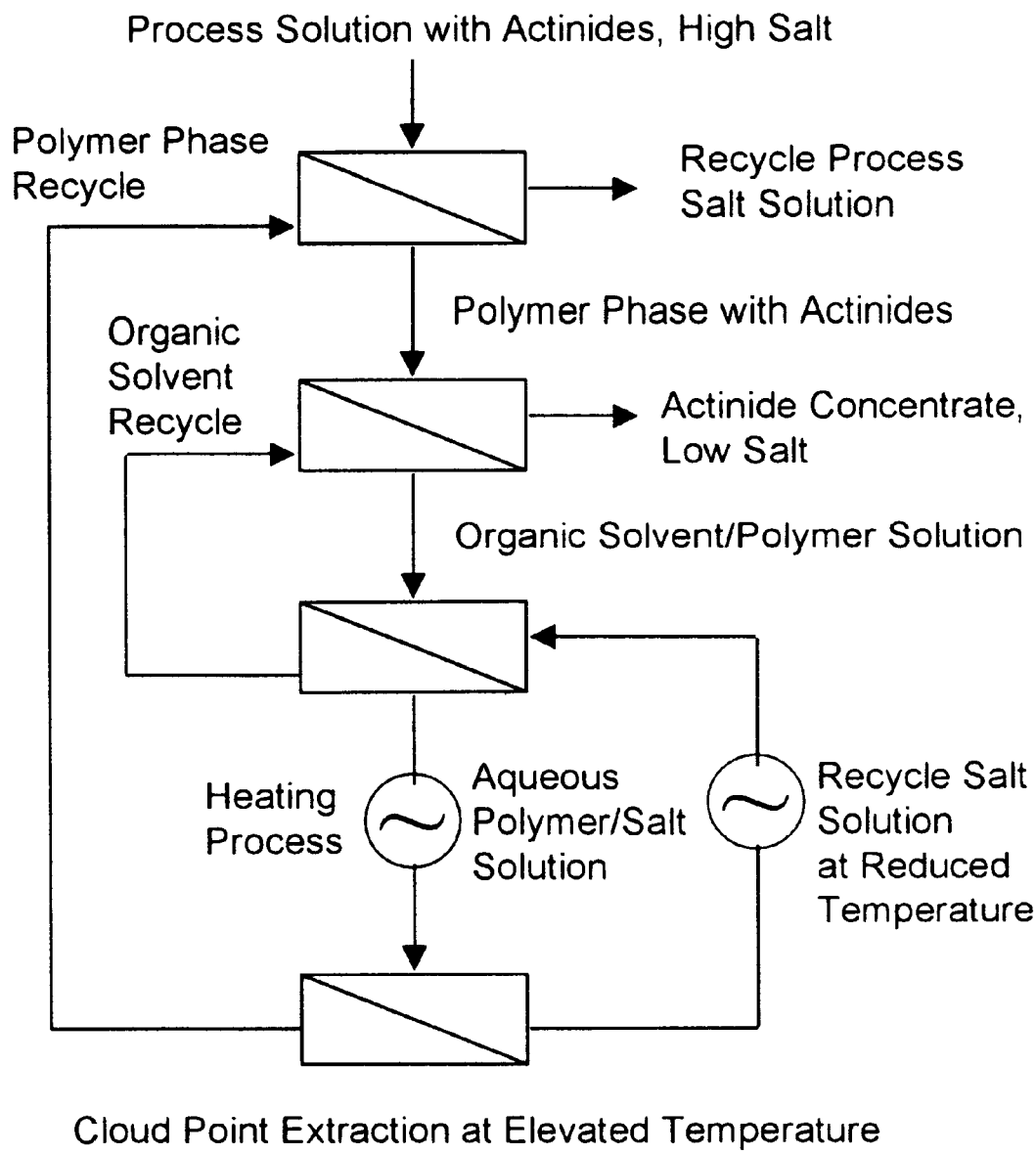
FIG. 3 is a schematic flow diagram of the invented method, specifically illustrating its use in the separation of complexed metal ions from a process solution.

A first non-limiting example of the method is the separation of complexed metal ions from a salt solution by aqueous biphasic extraction, as schematically illustrated in FIG. 3. The complexed metal ions are extracted from the process stream into a polymer-rich phase, followed by the separation of the extracted complexed metal ions from the polymer by extracting the polymer into an organic phase.

Certain metal ions selectively partition from high-ionic salt solutions directly into a polymer-rich phase. For example, in an appropriate aqueous biphase system, pertechnetate ($TcO_4^{2-}$) ions partition to the polymer-rich phase from a broad range of salt solutions. However, where metal ions do not possess any special affinity for the polymer phase, phase transfer agents, or complexants, are used to achieve the selective partitioning. The only requirement is that the metal complexes be water soluble and organic, preferably containing sulfonated aromatic rings. Two examples of complexants that are compatible with the aqueous biphase systems of the invented method are arsenazo III and chlorophosphonazo III.

In this example, actinides (e.g., $Pu^{4+}$, $UO_2^{2+}$, $Th^{4+}$) are extracted from highionic-strength salt solutions. As the actinides do not have any special affinity for the polymer phase, a phase transfer agent, such as chlorophosphonazo III, is added to the salt stream, preferably at low concentration levels, to selectively complex the actinides prior to metal extraction.

During metal extraction, the high-ionic-strength process solution containing the complexed actinides is contacted with the aqueous polymer solution to extract the complexed actinides. The complexed actinides, and any excess complexant, selectively partition from the salt-rich phase to the polymer-rich phase, and a substantially actinide-free salt solution remains for recycling into the system.

Figure 7:
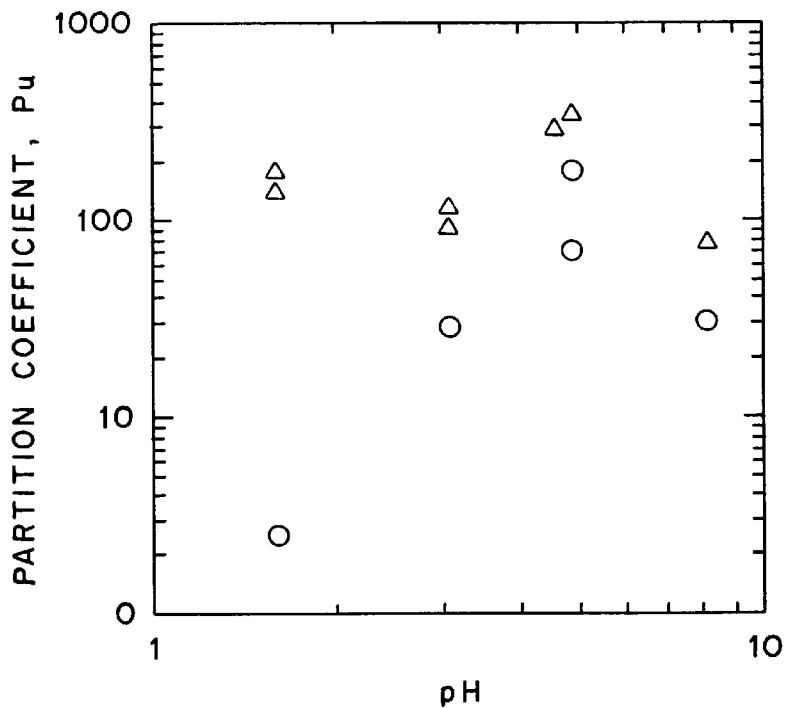
FIG. 7 is a graph of the partition coefficients for metal ions, specifically Pu(IV), as a function of PEG-phase pH in an aqueous biphasic extraction system.

FIG. 7 shows the partition coefficients for Pu(IV) by arsenazo III (o's) and chlorophosphonazo III (Δ's) as a function of PEG-phase pH in a PEG-3,400/$(NH_4)_2SO_4$ system at 25° C. The extractant concentrations were 0.0075 wt %.

Figure 8:
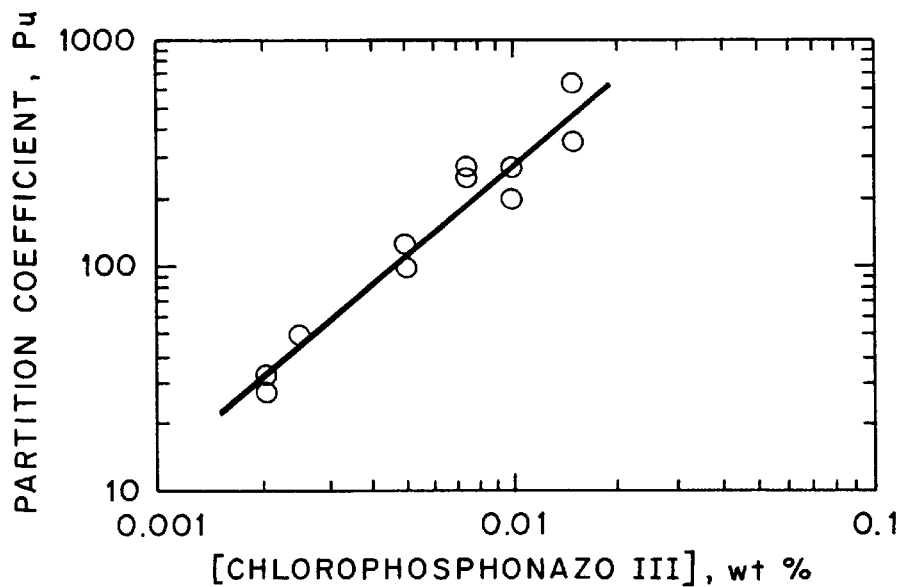
FIG. 8 is a graph of the partition coefficients for metal ions, specifically Pu(IV), as a function of the concentration of a phase transfer agent, specifically chlorophosphonazo III, in an aqueous biphasic extraction system.

FIG. 8 shows the partition coefficients for Pu(IV) as a function of chlorophosphonazo III concentration in a PEG-3,400/$(NH_4)_2SO_4$ system at 25° C. The extractant concentrations were 0.0075 weight percent.

In the polymer recovery step, the polymer is separated from the extracted metal complex by contacting the polymer-rich phase containing the metal ions with a water-immiscible organic phase, at an elevated temperature, preferably between about 60° C. to about 80° C. This step produces an aqueous stream with an increased concentration of the actinides and a low concentration of salt, and an organic solution containing the polymer. The actinide concentrate can be furthered processed for final disposal.

This example demonstrates an inexpensive approach to radio nuclide removal from high-ionic-strength process solutions used in decontamination operations. The invented method, including the recovery of the actinides from the polymer-rich phase, is especially attractive for the treatment of process solutions that contain high concentrations of salts, like sodium carbonate, sulfate, or phosphate. The technology permits metal recovery under conditions that, because of high salt concentration, are not amenable to treatment by ion exchange. Because of the highly efficient extracting ability of the invented method, significant reductions in waste volume are achievable.

EXAMPLE 2—HUMATE EXTRACTION

Figure 4:
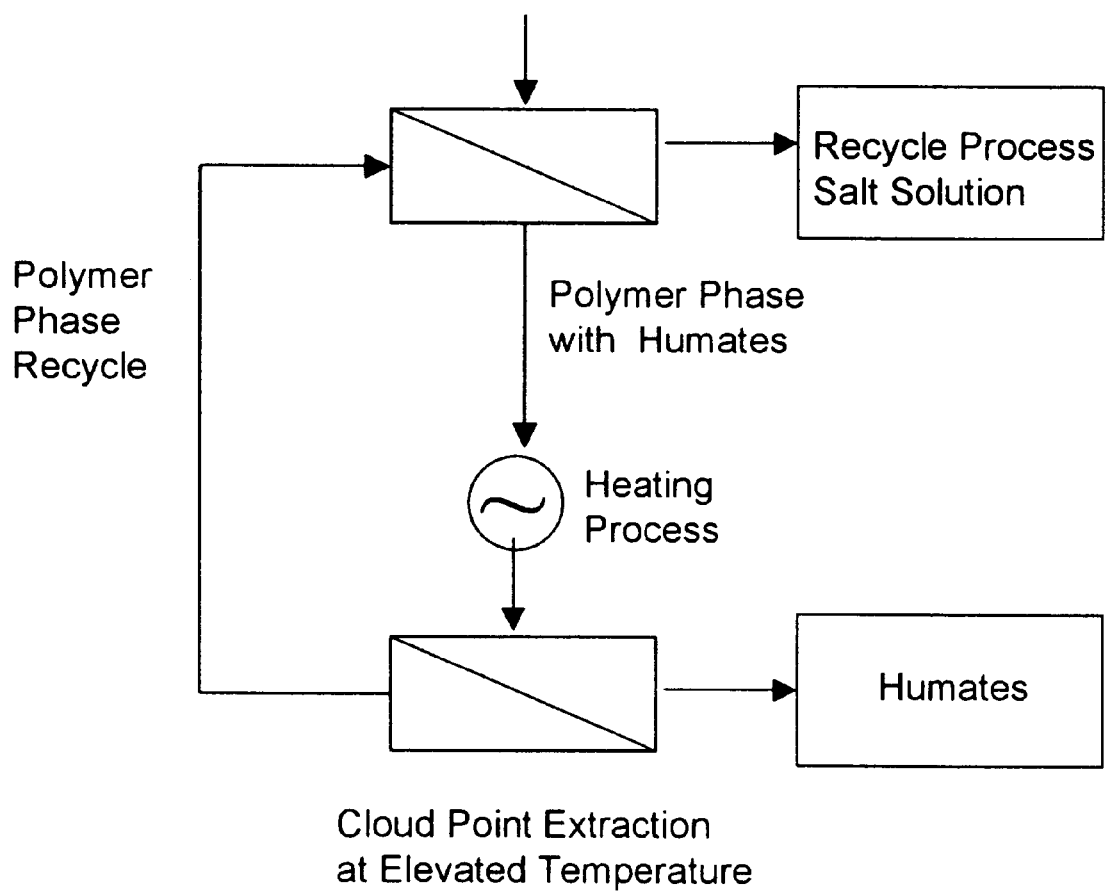
FIG. 4 is a schematic flow diagram of the invented method, specifically illustrating its use in the separation of humates from a Bayer process solution.

A second non-limiting example of the invented method is the separation of organic contaminants, such as humates, from a mineral processing stream by aqueous biphasic extraction, as schematically illustrated in FIG. 4. The organic contaminants are extracted from the process stream into a polymer-rich phase, followed by the separation of the extracted organic contaminants from the polymer by cloud point extraction.

Humates in Bayer process liquors originate from bauxite ore and lead to a number of serious processing problems, including reduced alumina recovery and purity, excessively fine aluminum hydroxide particles, loss of caustic values, and decreased red mud settling rates. Problems can be so severe that certain ore bodies with high alumina content are not mined because of high humate content.

The invented method is useful for extracting organic contaminants, including humic acids and humates, from Bayer process liquors. In the humate extraction step, the hot Bayer process liquor containing the organic contaminants, including humates, is contacted with an aqueous polymer solution. The organic contaminants partition to and concentrate in the polymer-rich phase. In one experiment, contacting the hot Bayer process solutions with an equal volume of 30 wt % PEG-1,500 resulted in an estimated removal of about 50% of the humates.

Processing temperatures may vary, although the preferred temperature is associated with the Bayer process at or about 70° C.

In this example, the alternate polymer recovery step as illustrated in FIGS. 2 and 4 is applied to separate and recover the polymer and organic contaminants. The alternate polymer recovery step includes cloud point extraction, whereby the temperature of the aqueous polymer solution containing the extracted organic contaminants is raised above the cloud point, such that the polymer and the organic contaminants separate into two distinct aqueous solutions.

The invented method may also be used to preferentially extract organic contaminants from soil in a soil decontamination process.

EXAMPLE 3—COLORANT EXTRACTION

Figure 5:
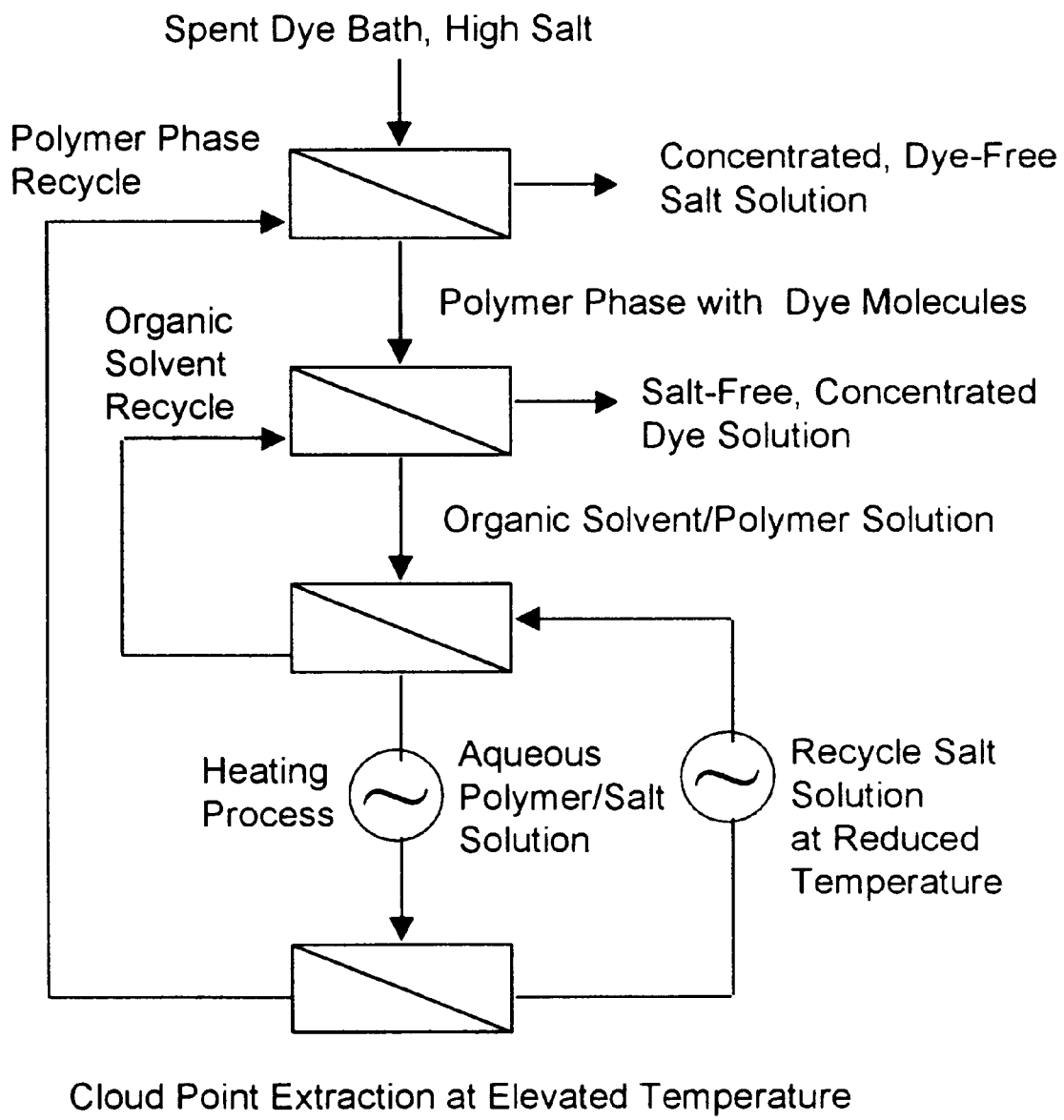
FIG. 5 is a schematic flow diagram of the invented method, specifically illustrating its use in the separation of colorants from a spent dye bath.
Figure 6:
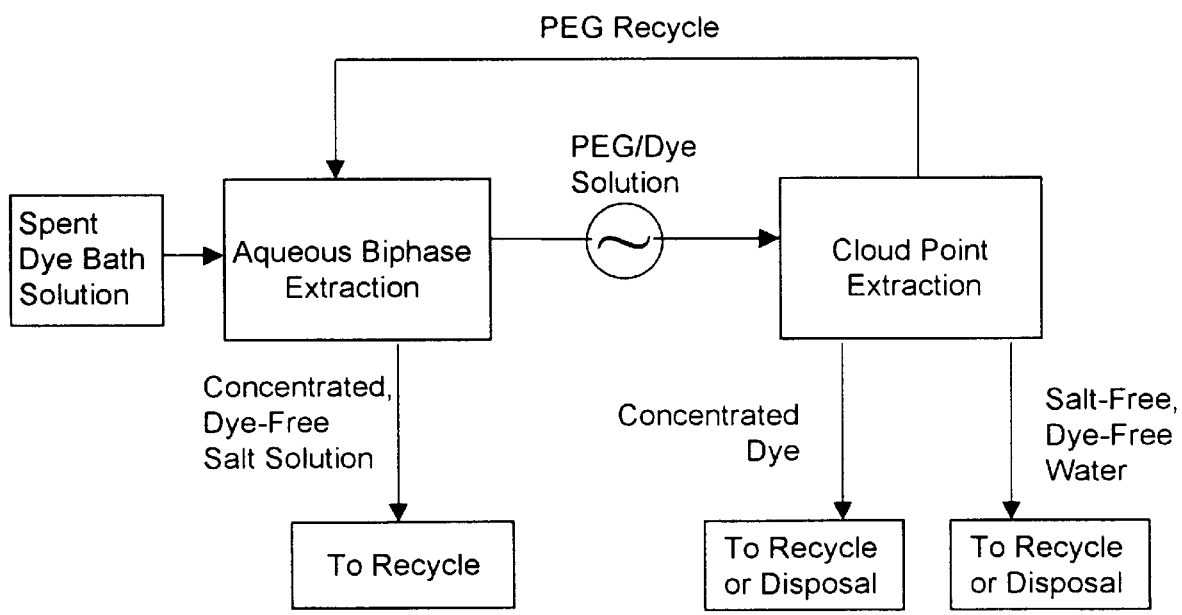
FIG. 6 is a schematic flow diagram of the invented method, specifically illustrating its use in the separation of colorants from a spent dye bath, including an alternate polymer recovery step.

A third non-limiting example of the invented method is the separation of colorants, and specifically dye molecules, from a textile wastewater stream by aqueous biphasic extraction, as schematically illustrated in FIGS. 5 and 6. The dyes are extracted from the process stream into a polymer-rich phase, followed by the separation of the extracted dyes from the polymer by extracting the polymer into an organic phase.

First, the spent dye bath (process stream), comprised of an aqueous inorganic salt solution containing a mixture of dyes and other additives used in the dying process, is contacted with an aqueous polymer solution, preferably methopolyethylene glycol(mPEG), to selectively partition the dyes into the polymer-rich phase. Importantly, the salt, an integral component of the dye bath, remains in a colorless aqueous solution and is available for recycling.

Second, the polymer is recovered from the polymer-rich phase containing the extracted dyes by contacting the loaded polymer phase with a water-immiscible alcohol, at an elevated temperature, preferably greater than about 50° C., whereby the polymer selectively partitions into the organic phase.

Third, the polymer is back extracted from the organic solution by contacting the organic solution with a dilute, aqueous salt solution at a temperature below about 20° C., and preferably at about 5° C.

Alternatively, as schematically shown in FIG. 6, the polymer can be recovered from the polymer-rich phase containing the extracted dyes by raising the temperature of the loaded polymer phase to between about 125° C. and about 150° C. The high temperature results in sufficient dehydration of the polymer to cause it to phase separate into a separate, dye-free phase.

The invented method was tested as follows: Sodium sulfate was used to generate an aqueous biphase system with PEGs having molecular weights ranging from 3,400 to 20,000 and mPEG having a molecular weight of 5,000. A series of hydrolyzed reactive dyes, several direct dyes, a sulfur dye, and a vat dye were all extracted from the salt-rich phase to the polymer-rich phase at temperatures ranging from 50° C. to 70° C. In all cases, extraction of the dyes, both individually and in various combinations, produced a colorless product stream while simultaneously concentrating the dye in the polymer-rich phase by a factor of 500 or more.

By adjusting the temperature of the extraction system, it is possible to produce aqueous biphase systems, and hence, colorless dye bath solutions at salt concentrations (e.g., sodium sulfate or sodium chloride) as low as 0.1 to 0.5 wt %. The concentrations of polymer and salt required to generate an aqueous biphase system can be obtained from the appropriate phase diagrams as a function of temperature.

In the polymer recovery step, the polymer was separated from the extracted dyes by contacting the dye-loaded PEG-rich phase with n-butanol. The partition coefficient for the PEG-3,400 between n-butanol and the aqueous solution containing the PEG-3,400 and dye was about 2.0 at 60° C. While the PEG recovery in the alcohol phase was in excess of 99%, the dye did not partition into the alcohol, but remained in the aqueous phase.

By lowering the temperature to less than 20° C. and contacting the PEG/n-butanol phase with deionized water or dilute salt solutions, the PEG was effectively extracted from the alcohol phase, with a partition coefficient of about 0.02.

The invented method provides an efficient and continuous system for extracting spent dye from wastewater streams. The method is cost effective because the salt component can be concentrated and recycled. In addition, the volume of wastewater is significantly reduced.

Separating soluble materials, including organic species and polymers, by contacting and/or mixing solutions comprising phases of a biphase systems as described herein may be accomplished by procedures known in the art, including, but not limited to, single stage extraction, multi-stage extraction, and continuous countercurrent extraction.

The foregoing description of a preferred embodiment of the invention has been presented for purposes of illustration and description. It is not intended to be exhaustive or to limit the invention to the precise form disclosed, and obviously many modifications and variations are possible in light of the above teaching. The embodiments described explain the principles of the invention and practical applications and should enable others skilled in the art to utilize the invention in various embodiments and with various modifications as are suited to the particular use contemplated. While the invention has been described with reference to details of the illustrated embodiment, these details are not intended to limit the scope of the invention, rather the scope of the invention is to be defined by the claims appended hereto.

The embodiments of the invention in which an exclusive property or privilege is claimed are defined as follows:

1. A method for separating and recovering water-miscible organic species from an aqueous process stream utilizing biphase systems comprised of two immiscible liquid phases, comprising, the steps of generating a first aqueous biphase system by contacting a first liquid phase comprised of the aqueous process stream containing water-miscible organic species and a phase-forming component with a second liquid phase comprised of an aqueous solution containing a polymer, whereby the first and second liquid phases are immiscible one from the other, allowing sufficient time to transfer the organic species from the first liquid phase of the first aqueous biphase system to the second liquid phase of the first aqueous biphase system, whereby the organic species is concentrated in the second liquid phase, forming an aqueous polymer solution containing organic species, allowing the two phases of the first aqueous biphase system to stratify;

isolating the two phases of the first aqueous biphase system one from the other;

recovering the first phase of the first aqueous biphase system comprising the aqueous process stream substantially free of organic species;

recovering the second phase of the first aqueous biphase system comprising the aqueous polymer solution containing organic species;

generating a second biphase system by contacting a first liquid phase comprised of the recovered aqueous polymer solution containing organic species with a second liquid phase comprised of a water-immiscible organic solvent, whereby the first and second phases are immiscible one to the other;

allowing sufficient time to transfer the polymer from the first liquid phase of the second biphase system to the second liquid phase of the second biphase system, whereby the polymer is concentrated in the second liquid phase, forming an organic polymer solution;

allowing the two phases of the second biphase system to stratify;

isolating the two phases of the second biphase system one from the other;

recovering the first phase of the second biphase system comprising the aqueous solution substantially free of polymer and containing a higher concentration of organic species than the concentration of organic species in the aqueous process stream; and recovering the second phase of the second biphase system comprising the organic polymer solution.

2. The method according to claim 1, further comprising the step of separating the polymer from the recovered organic polymer solution by contacting the organic polymer solution with an aqueous solution, whereby the polymer transfers from the organic polymer solution to the aqueous solution, resulting in a remaining aqueous polymer solution and a remaining water-immiscible organic solvent.

3. The method according to claim 2, wherein the aqueous solution comprises a dilute salt solution.

4. The method according to claim 2, wherein the aqueous solution comprises deionized water.

5. The method according to claim 2, wherein the step of separating the polymer from the recovered organic polymer solution is conducted at a temperature of less than about 20° C.

6. The method according to claim 2, wherein the step of separating the polymer from the recovered organic polymer solution is conducted at a temperature of about 5° C.

7. The method according to claim 2, further comprising the steps of recycling the remaining aqueous polymer solution as the second phase of the first aqueous biphase system and recycling the remaining water-immiscible organic solvent as the second phase of the second biphase system.

8. The method according to claim 1, wherein the step of allowing sufficient time to transfer the polymer further comprises the step of maintaining the second biphase system at a temperature of greater than about 50° C.

9. The method according to claim 1, wherein the step of allowing sufficient time to transfer the polymer further comprises the step of maintaining the second biphase system at a temperature in the range of between about 60° C. and about 80° C.

10. The method according to claim 1, wherein the organic solvent is water-immiscible alcohol.

11. The method according to claim 10, wherein the alcohol is selected from the group consisting of butanol, pentanol, and the structural isomers of butanol and pentanol.

12. The method according to claim 1, wherein the polymer is polyethylene glycol.

13. The method according to claim 1, wherein the polymer is selected from group consisting of polypropylene glycol, polyvinyl alcohol, methoxypolyethylene glycol, branched polyethylene glycol, polyvinylpyrrolidone, and copolymers of polyethylene glycol and polypropylene glycol.

14. The method according to claim 1, wherein the polymer has a molecular weight in the range of between about 1,500 and about 20,000.

15. The method according to claim 1, wherein the polymer is polypropylene glycol and has a molecular weight in the range of between about 400 and about 700.

16. The method according to claim 1, wherein the phase-forming component is comprised of at least one inorganic salt.

17. The method according to claim 16, wherein the inorganic salt is selected from the group consisting of alkali metal salts of sulfate, sulfite, carbonate, phosphate, arsenate, selenate, tungstate, molybdate, chromate and hydroxide, and combinations thereof, and wherein the first aqueous biphase system is generated at a temperature in the range of between about 60° C. and about 70° C.

18. The method according to claim 16, wherein the inorganic salt is selected from the group consisting of alkali metal salts of fluoride, chloride, and bromide, and wherein the first aqueous biphase system is generated at a temperature in the range of between about 95° C. and about 120° C.

19. The method according to claim 16, wherein the inorganic salt is selected from the group consisting of nitrate salt or nitrite salt, and wherein the first aqueous biphase system is generated at a temperature in the range of between about 95° C. and about 120° C.

20. The method according to claim 16, wherein at least two inorganic salts comprise the phase-forming component selected from the group consisting of alkali metal salts of sulfate, sulfite, carbonate, phosphate, arsenate, selenate, tungstate, molybdate, chromate, hydroxide, fluoride, chloride, bromide, nitrate salt and nitrite salt, and combinations thereof.

21. The method according to claim 1, wherein the phase-forming component is comprised of a polymer.

22. The method according to claim 1, wherein the first and second liquid phases of the first aqueous biphase system contain at least about 60 to 90 wt % water.

23. The method according to claim 1, wherein the water-miscible organic species are complexed metal ions.

24. The method according to claim 23, wherein the metal complexants are water-miscible organic molecules containing aromatic rings.

25. The method according to claim 23, wherein the metal complexants are water-miscible organic molecules containing sulfonate groups.

26. The method according to claim 1, wherein the water-miscible organic species are humic acids.

27. The method according to claim 1, wherein the water-miscible organic species are dyes.

* * * * *